United States Patent
Hampel et al.

(10) Patent No.: US 9,888,365 B2
(45) Date of Patent: Feb. 6, 2018

(54) NETWORK-BASED CONTROL FOR THE RELAYING OF DEVICE-TO-DEVICE DISCOVERY MESSAGES

(71) Applicant: QUALCOMM Incorporated, San Diego, CA (US)

(72) Inventors: Karl Georg Hampel, New York, NY (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 14/948,882

(22) Filed: Nov. 23, 2015

(65) Prior Publication Data

US 2017/0150326 A1    May 25, 2017

(51) Int. Cl.
*H04W 72/04*    (2009.01)
*H04W 4/06*    (2009.01)
(Continued)

(52) U.S. Cl.
CPC ........... *H04W 4/06* (2013.01); *H04W 72/042* (2013.01); *H04W 76/023* (2013.01); *H04W 8/005* (2013.01); *H04W 88/04* (2013.01)

(58) Field of Classification Search
CPC ........... H04W 4/00; H04W 4/06; H04W 8/00; H04W 8/005; H04W 28/24; H04W 76/02;
(Continued)

(56) References Cited

U.S. PATENT DOCUMENTS

| | | | |
|---|---|---|---|
| 2004/0162871 A1* | 8/2004 | Pabla | H04W 8/005 709/201 |
| 2011/0202606 A1* | 8/2011 | Agarwal | H04L 12/1859 709/206 |

(Continued)

FOREIGN PATENT DOCUMENTS

| | | |
|---|---|---|
| WO | 2014181272 A1 | 11/2014 |
| WO | 2015028357 A1 | 3/2015 |

OTHER PUBLICATIONS

Gabor F., et al., "Device-to-Device Communications for National Security and Public Safety", IEEE Access, vol. 2, Mar. 14, 2015 (Mar. 14, 2015), pp. 1510-1520, XP011569308, DOI: 10.1109/ACCESS.2014.2379938 [retrieved on Jan. 6, 2015].

(Continued)

*Primary Examiner* — Asfar M Qureshi
(74) *Attorney, Agent, or Firm* — Arent Fox LLP

(57) ABSTRACT

A method, an apparatus, and a computer-readable medium for wireless communication are provided. The apparatus receives a policy containing information on filtering and processing of discovery messages over a wireless interface. The policy may be received from a cellular network or from a network server. The apparatus determines a set of filtering rules and a set of processing rules based on the policy. The apparatus may store the set of filtering rules and the set of processing rules. Upon receiving a discovery message on a device-to-device communication channel, the apparatus applies the set of filtering rules to the discovery message. The device-to-device communication channel may be a wireless communication channel. The apparatus may apply the set of processing rules to the discovery message in response to the discovery message passing the set of filtering rules. The apparatus may rebroadcast the processed discovery message.

30 Claims, 15 Drawing Sheets

(51) Int. Cl.
*H04W 76/02* (2009.01)
*H04W 8/00* (2009.01)
*H04W 88/04* (2009.01)

(58) Field of Classification Search
CPC .............. H04W 76/023; H04W 72/042; H04L 12/1859
USPC ................................................. 370/328–331
See application file for complete search history.

(56) References Cited

U.S. PATENT DOCUMENTS

| | | | | |
|---|---|---|---|---|
| 2011/0320570 | A1* | 12/2011 | Ewing | ..................... H04W 4/00 709/218 |
| 2014/0056220 | A1 | 2/2014 | Poitau et al. | |
| 2014/0219095 | A1 | 8/2014 | Lim et al. | |
| 2014/0254513 | A1* | 9/2014 | Abraham | ............... H04W 8/005 370/329 |
| 2015/0017979 | A1* | 1/2015 | Kang | .................... H04W 8/005 455/426.1 |
| 2015/0043438 | A1* | 2/2015 | Fwu | ....................... H04W 28/24 370/329 |
| 2015/0043448 | A1 | 2/2015 | Chatterjee et al. | |
| 2016/0128123 | A1* | 5/2016 | Li | .......................... H04W 72/08 370/252 |
| 2016/0269185 | A1 | 9/2016 | Stojanovski et al. | |
| 2017/0034686 | A1 | 2/2017 | Zhang et al. | |

OTHER PUBLICATIONS

International Search Report and Written Opinion—PCT/US2016/059706—ISA/EPO—dated Feb. 16, 2017.
Lin X., "Integrated Cellular and Device-to-Device Networks," Dec. 2014, 232 pages.

* cited by examiner

NETWORK-BASED CONTROL FOR THE RELAYING OF DEVICE-TO-DEVICE DISCOVERY MESSAGES

BACKGROUND

Field

The present disclosure relates generally to communication systems, and more particularly, to the relaying of device-to-device discovery messages.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus for wireless communication are provided. The apparatus receives a policy containing information on filtering and processing of discovery messages. The apparatus determines a set of filtering rules and a set of processing rules based on the policy. The apparatus may store the set of filtering rules and the set of processing rules. Upon receiving a discovery message on a device-to-device communication channel, the apparatus applies the set of filtering rules to the discovery message. The apparatus may apply the set of processing rules to the discovery message in response to the discovery message passing the set of filtering rules. The apparatus may rebroadcast the processed discovery message.

In another aspect of the disclosure, a method, a computer-readable medium, and an apparatus for wireless communication are provided. The apparatus receives a discovery message on a device-to-device communication channel. The apparatus applies a filter function to the discovery message to determine whether instructions on rebroadcast the discovery message are to be obtained from a network. The apparatus may extract message information from the discovery message in response to an outcome of the applying of the filter function that the instructions on rebroadcast the discovery message are to be obtained from the network. The apparatus may transmit the extracted message information. The apparatus may receive instructions on rebroadcast of the discovery message. The apparatus may process the discovery message based on the instructions on rebroadcast of the discovery message. The apparatus may rebroadcast the processed discovery message based on the received instructions.

DETAILED DESCRIPTION

Figure 1:
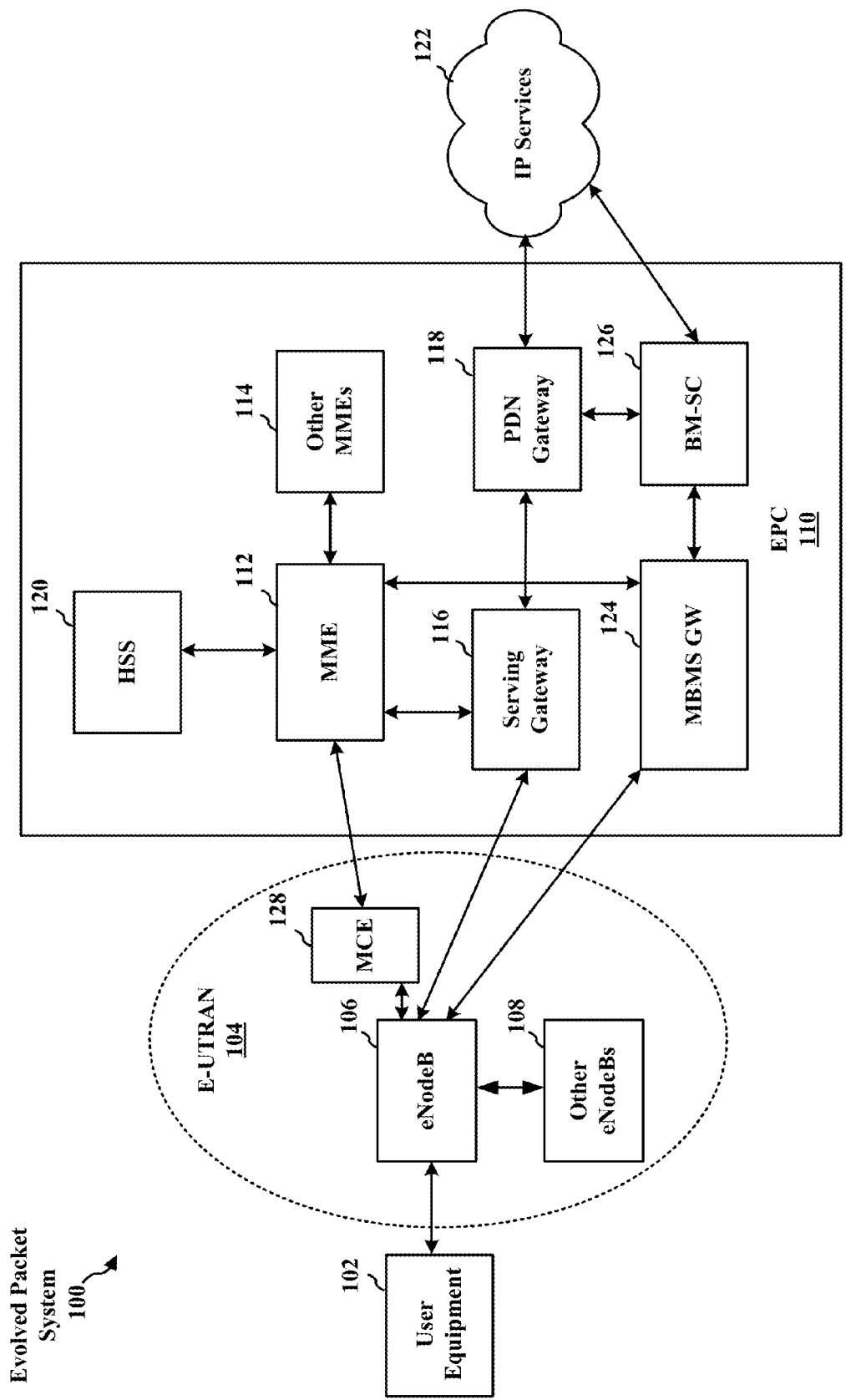
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a wearable device, a smart watch, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
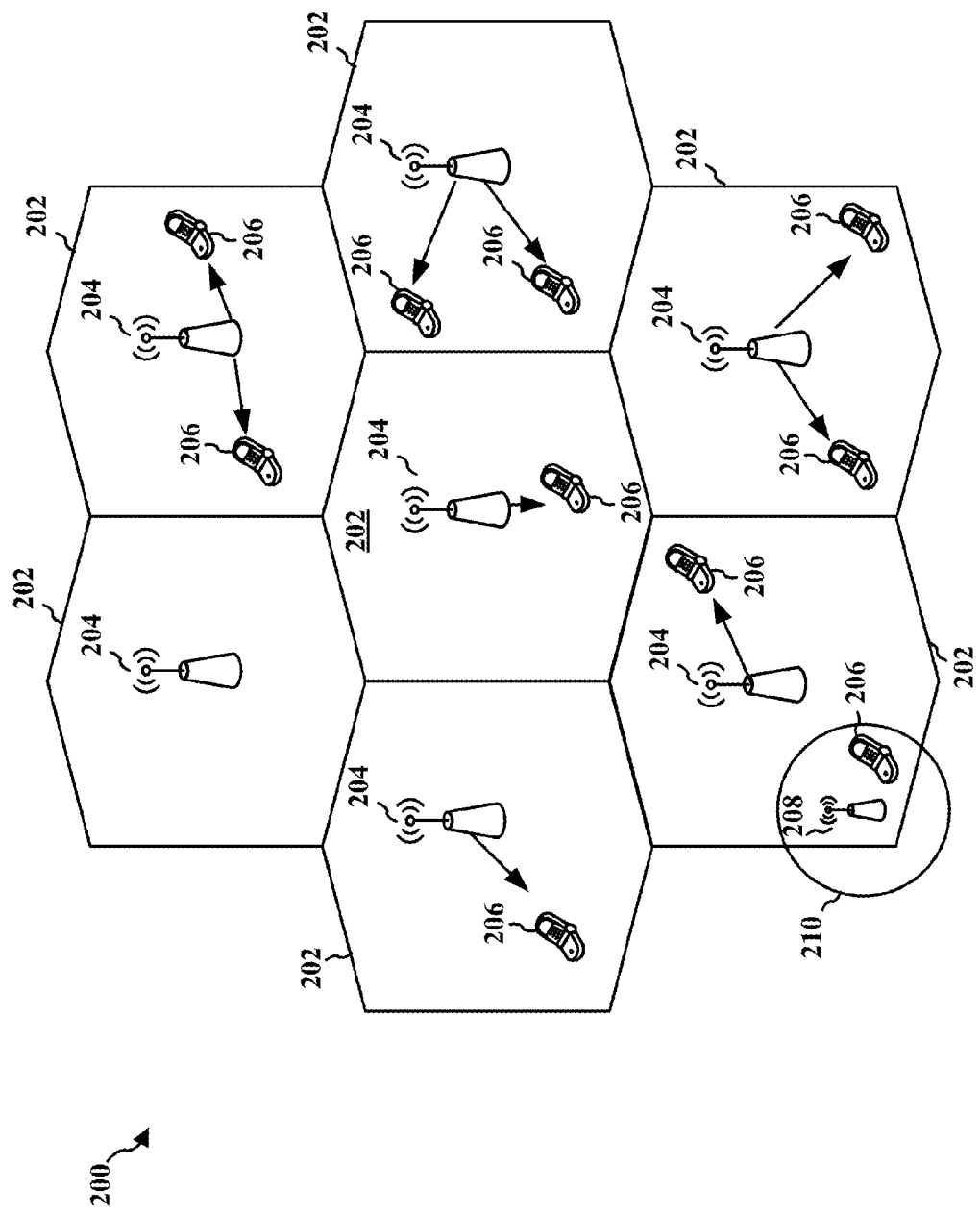
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
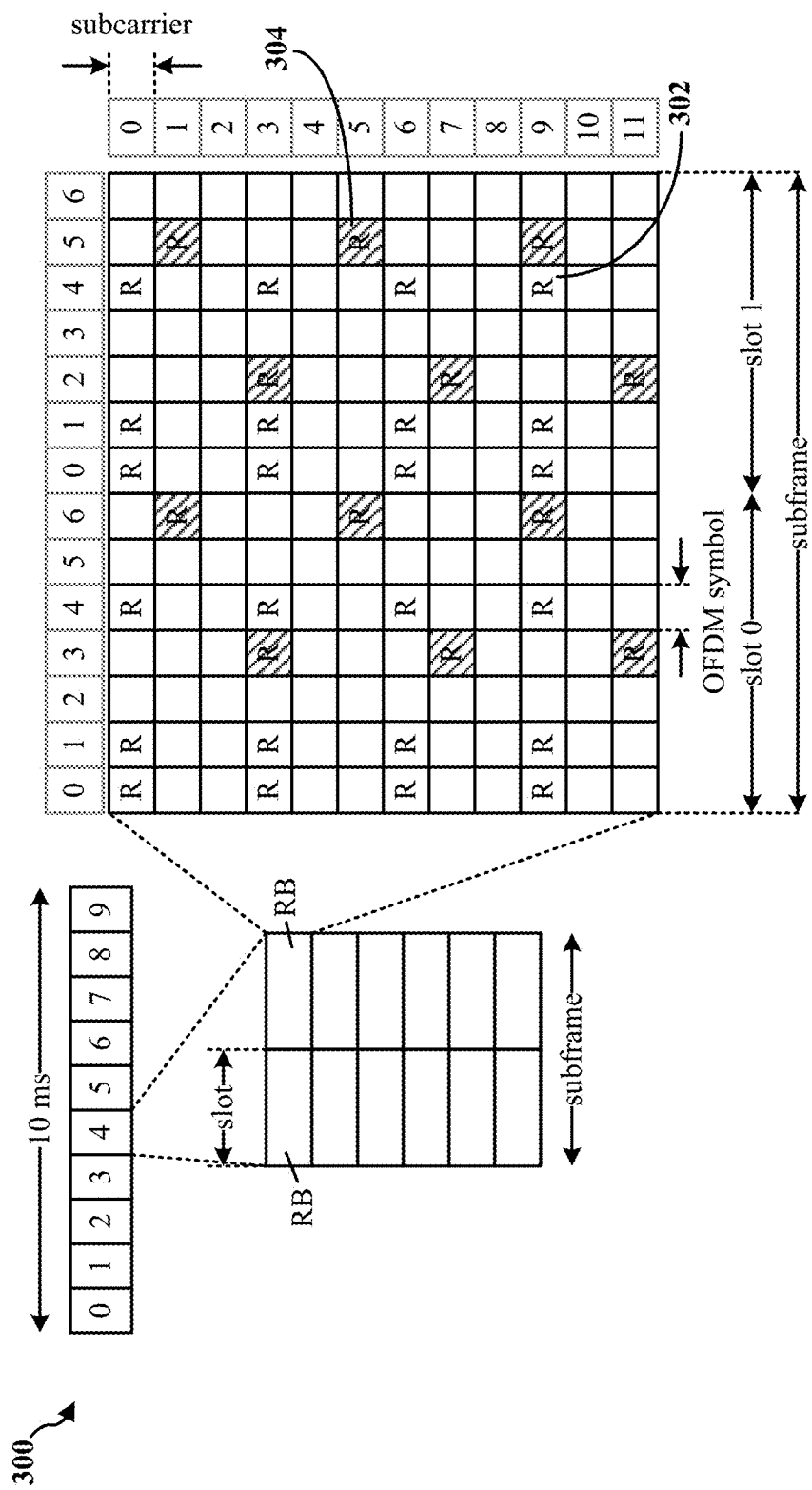
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
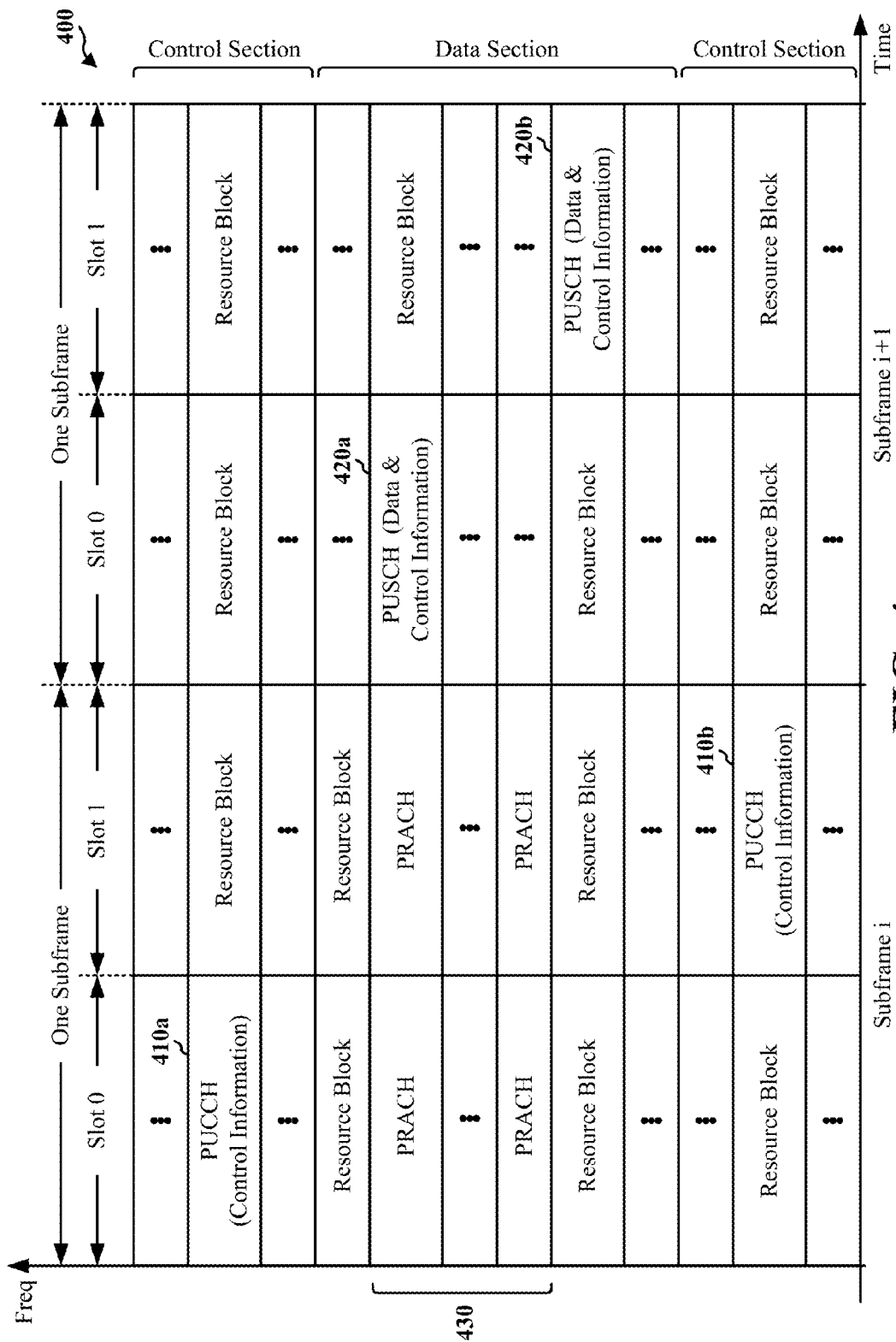
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
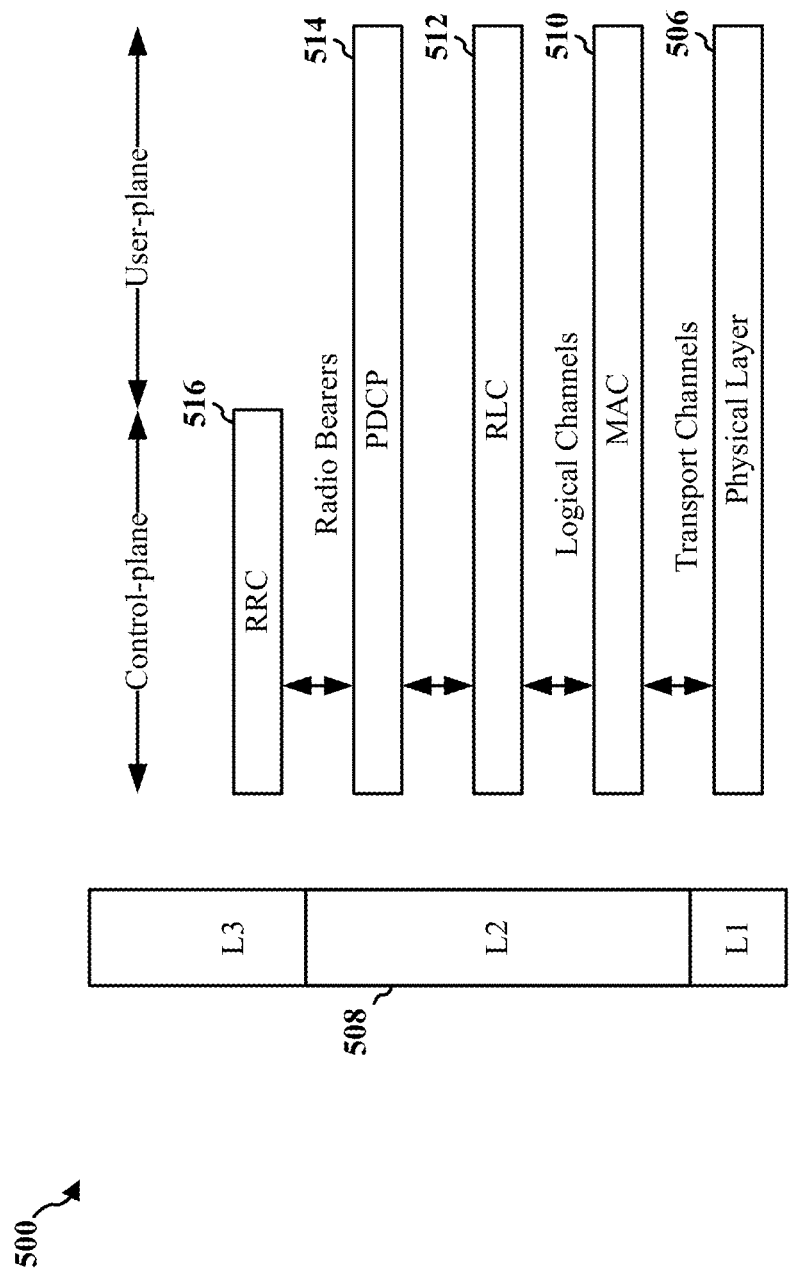
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
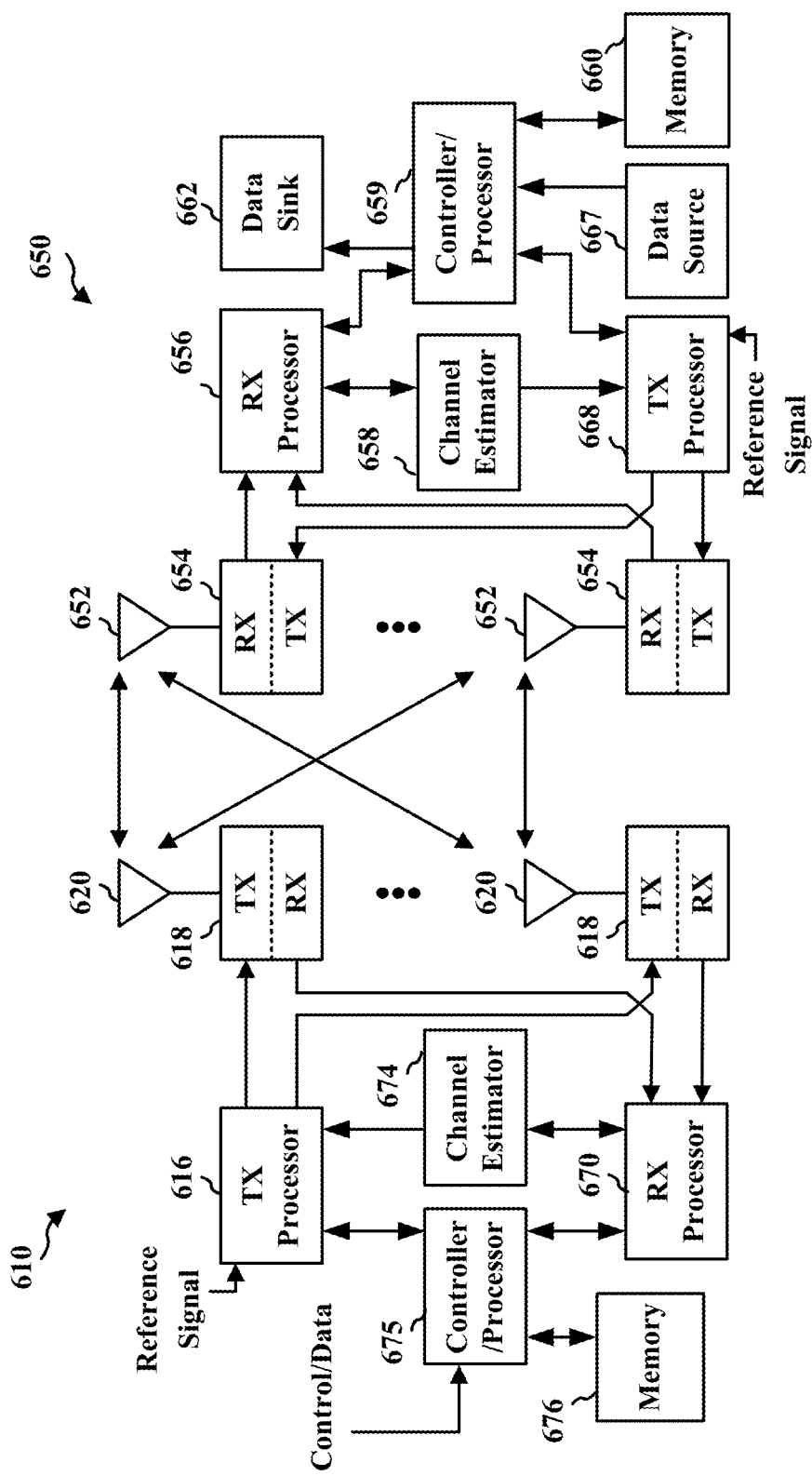
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
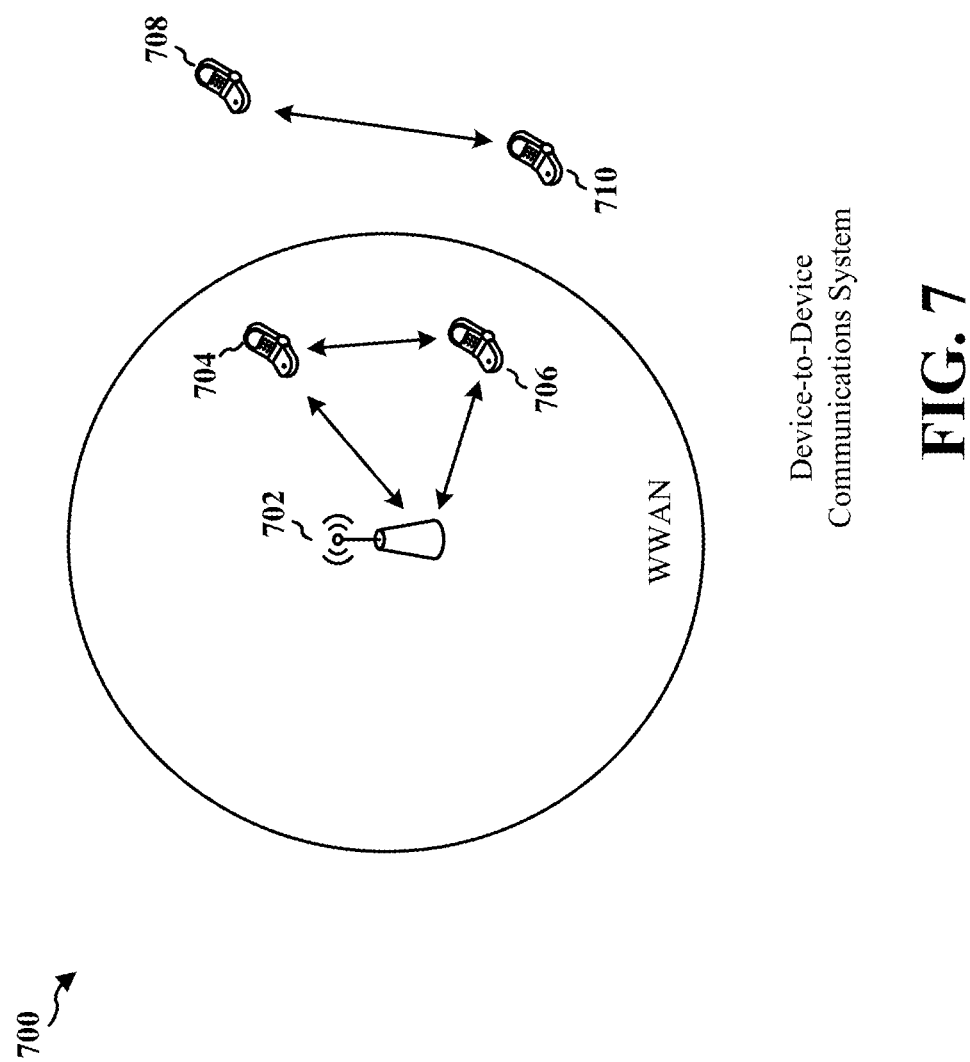
FIG. 7 is a diagram of a device-to-device communications system.

FIG. 7 is a diagram of a device-to-device (D2D) communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Proximity services (ProSe) render information with proximity relevance to subscribers of mobile devices. Proximity services, for instance, may be used by advertising points to deliver coupons to subscribers who pass a store where these coupons can be redeemed. In another use case, proximity services are exploited by friend-finder applications that alert subscribers upon (unknowingly) approaching the location of one of their friends or family members.

Proximity services can be realized via device-to-device discovery mechanisms as supported by a device-to-device communication system, for example, based on LTE-Direct (LTE-D). Such mechanisms provide wireless resources which are used by mobile devices to receive discovery messages transmitted by peer devices. Due to the finite propagation of the wireless signals, such D2D discovery messages are inherently range-limited hence conveying the experience of proximity upon detection.

While the discovery range is inherently determined by the wireless signal propagation environment and the power levels of the participating devices, the desired proximity range is defined by the superseding application, which may be significantly different from the discovery range. Especially in urban environments, where wireless signal propagation is limited due to the dense infrastructure, the discovery range may be too small for many proximity services.

One way to address this mismatch between the discovery range and the desired proximity range is to allow discovery messages to be rebroadcast (relayed) by discovering devices (i.e., the device receiving the discovery message) and therefore propagate along two or more hops. While such multi-hop discovery allows extending the discovery range significantly, such multi-hop discovery comes at the following disadvantages: 1) it increases battery drainage due to rebroadcast; 2) it increases interference, thus adversely impacting single-hop discovery events that run in parallel to multi-hop discovery; 3) it reduces discovery opportunities for the rebroadcasting devices due to half-duplex constraints (e.g. the rebroadcasting devices cannot discovery peers while rebroadcasting messages).

To address these issues of multi-hop discovery, in one configuration, network-based control/regulation mechanism is introduced for the relaying (or rebroadcasting) of discovery messages. Such a network-based control mechanism also allows adjusting the maximum number of hops, thus adjusting the discovery range on a per-service manner.

Figure 8:
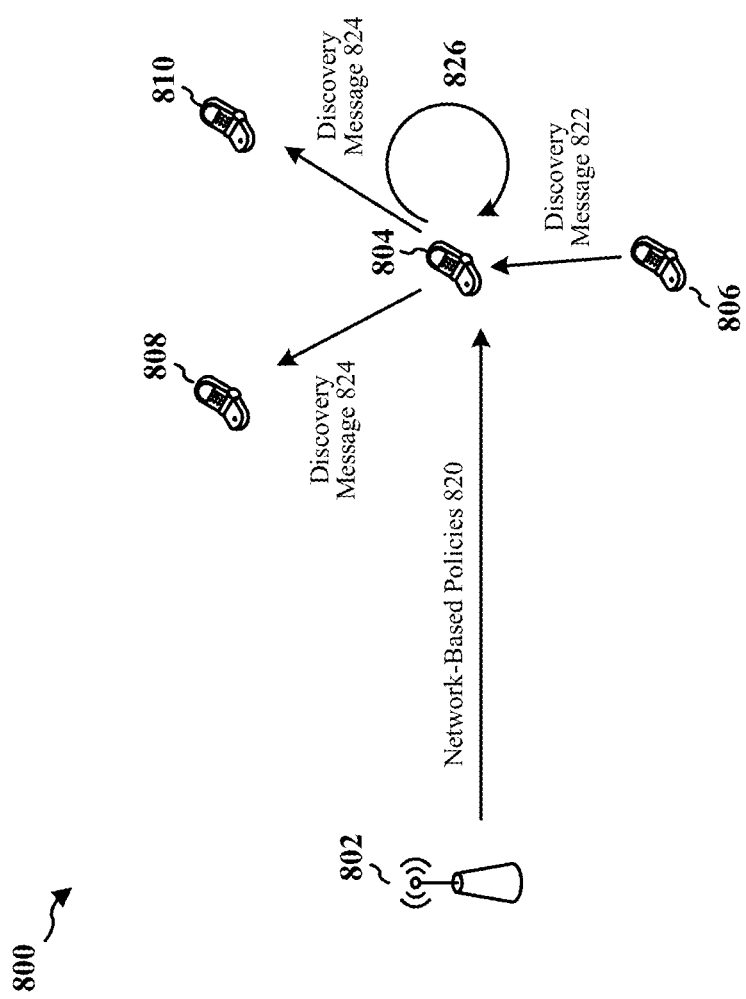
FIG. 8 is a diagram illustrating an example of using network-based control mechanism for the relaying of device-to-device discovery messages in a device-to-device communications system.

FIG. 8 is a diagram illustrating an example of using network-based control mechanism for the relaying of device-to-device discovery messages in a device-to-device communications system 800. The D2D communications system 800 includes several wireless devices 804, 806, 808, 810, and a base station or access point 802. Some of the wireless devices 804, 806, 808, 810 may communicate together in device-to-device communication using the DL/UL WWAN spectrum, some of them may communicate with the base station 802, and some may do both. For example, as shown in FIG. 8, the wireless devices 804, 806 are in device-to-device communication and the wireless device 804 is in device-to-device communication with wireless devices 808 and 810. The wireless device 804 is also communicating with the base station 802.

In one configuration, the wireless device 804 receives, from the base station 802, network-based policies 820 on the filtering and processing of discovery messages for rebroadcast. The network-based policies 820 may be received through a wireless interface. The wireless interface may refer to the downlink from the base station or access point 802. The base station 802 may pertain to a cellular network which directly provides the network-based policies 820 for the relaying of discovery messages. The wireless device 804 may also connect to a server (not shown) to retrieve the network-based policies 820 using a wireless link to the base station or access point 802. The server may for instance refer to a Proximity Services Function in LTE. The wireless device 804 caches all information related to the network-based policies 820.

Upon reception of a discovery message 822 on a D2D channel from the wireless device 806, the wireless device 804 applies (at 826) filtering to the discovery message 822 based on the network-based policies 820. If the discovery message 822 passes the filtering, the wireless device 804 processes (at 826) the discovery message 822 based on the network-based policies 820. The processed discovery message 824 is then rebroadcast or relayed to the wireless devices 808 and 810 on a D2D channel.

Figure 9:
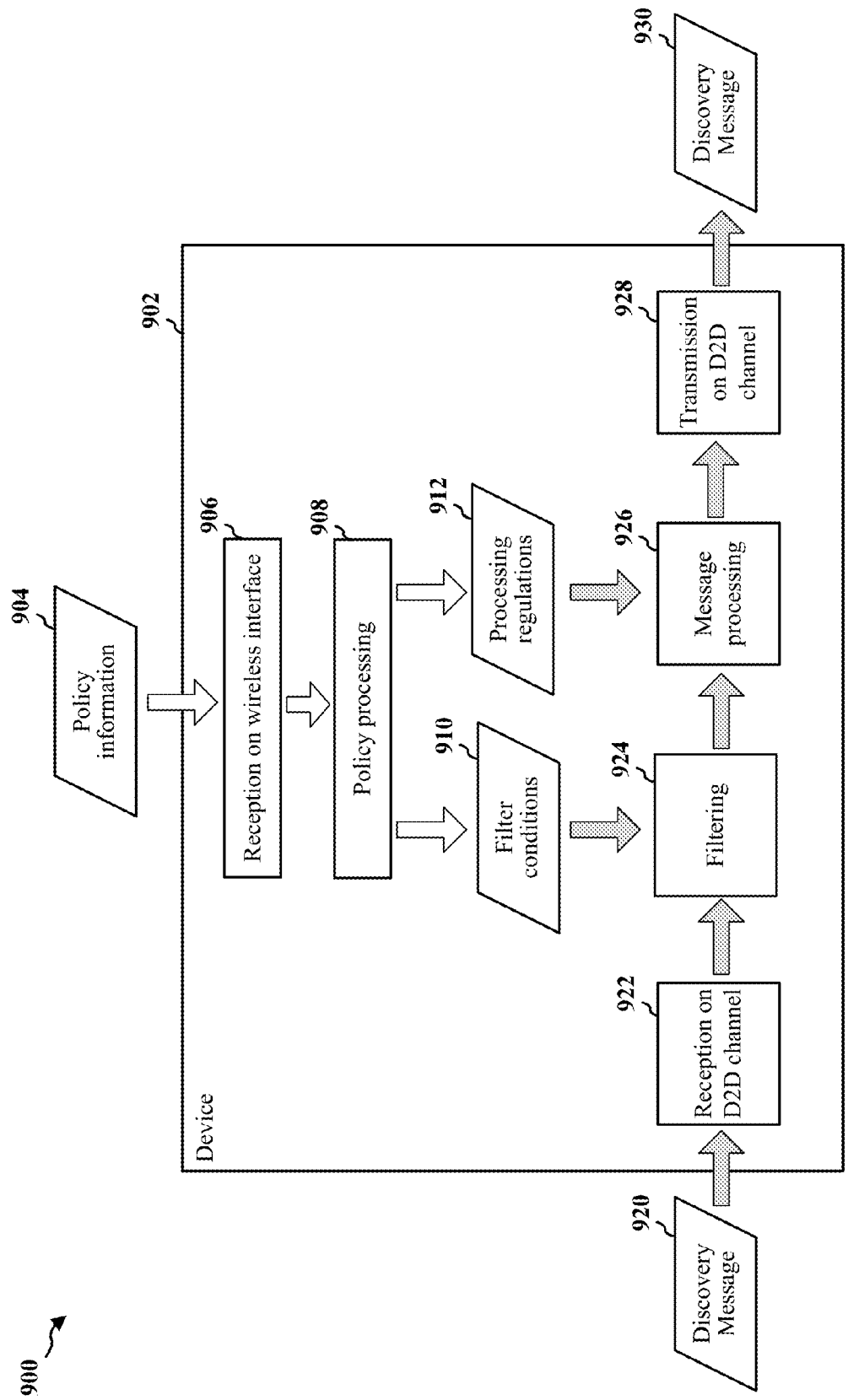
FIG. 9 is a diagram illustrating an example of network-based control mechanism for relaying or rebroadcasting of discovery messages.

FIG. 9 is a diagram 900 illustrating an example of network-based control mechanism for relaying or rebroadcasting of discovery messages. In one configuration, this example of network-based control mechanism may be used in the D2D communications system 800 described above with reference to FIG. 8. In this example, a wireless device 902 receives a discovery message 920. The wireless device 902 filters and processes the discovery message 920 based on network-based policy information 904. The wireless device 902 rebroadcasts (relays) the processed discovery message 930 to nearby wireless devices. In one configuration, each of the wireless device 902 and its peers may be a UE (e.g. the UE 102, 206, the wireless device 804, or the apparatus 1402/1402'). In one configuration, the device 902 may be the wireless device 804 described above with reference to FIG. 8.

In one configuration, the device 902 receives (at 906), over a wireless interface from a network, policy information 904 defining filtering conditions and message processing regulations for the relaying (rebroadcasting) of discovery messages. In one configuration, the policy information 904 may be the network-based policies 820 described above with reference to FIG. 8. The device 902 processes (at 908) the received policy information 904 to obtain filter conditions 910 and message processing regulations 912 for the relaying (rebroadcasting) of discovery messages. The device 902 caches the filter conditions 910 as well as the message processing regulations 912 in an appropriate format, e.g. in tables.

Upon reception (at 922) of a discovery message 920 on a D2D channel, the device 902 applies a filter function which decides if the discovery message 920 is due for rebroadcast by applying (at 924) the filtering rules/conditions 910 cached. In one configuration, the discovery message 920 may be the discovery message 822 described above with reference to FIG. 8. In case the discovery message 920 passes filtering, the device 902 processes (at 926) the discovery message 920 based on the corresponding message processing regulations 912 cached, which potentially alters the content of the discovery message 920. The device 902 transmits (at 928) the processed discovery message 930 on a D2D channel. In one configuration, the discovery message 930 may be the discovery message 824 described above with reference to FIG. 8.

In one configuration, the wireless interface may refer to the downlink from a base station or an access point (e.g., the base station or access point 802 described above with reference to FIG. 8). The base station may pertain to a cellular network which directly provides the policy information 904 for the relaying of discovery messages. The device 902 may also connect to a server to retrieve the policy information 904 using a wireless link to a base station or an access point (e.g., 802). The server may refer to a Proximity Services Function in LTE.

In one configuration, the device 902 may obtain the policy information 904 when associating, registering or authenticating with the network that supports proximity services or the air-interface resources used for the proximity services. In one configuration, the device 902 may retrieve the policy information 904 periodically, e.g. after certain time periods, when entering a new cell or when connecting to the network for other reasons.

In one configuration, a D2D channel may refer to a wireless protocol that permits exchange of discovery messages between wireless devices. Such a D2D channel may be provided by technologies such as LTE-D, near-me area network (NAN), Social WiFi, iBeacon, 802.11 ad-hoc mode, for instance. In one configuration, the D2D channel may share wireless resources such as spectrum with other wireless services. For example, a D2D channel based on LTE-Direct or WiFi-Direct may share wireless resources with other wireless services. In one configuration, D2D discovery may use dedicated wireless resources.

In one configuration, message filtering at 924 may be based on RF properties such as signal strength, signal-to-interference-plus-noise ratio (SINR), or signal-to-noise ratio (SNR), noise rise, interference encountered during the reception of the discovery message 920. In one configuration, message filtering at 924 may refer to MAC-related properties such as the number of messages decoded within a certain time frame prior to the reception of the discovery message 920. In one configuration, message filtering at 924 may refer to particular content contained in the discovery message 920 such as an explicit rebroadcast request flag or a multi-hop count value. In one configuration, message filtering at 924 may refer to the ability of message authentication based on a message authentication code contained in the discovery message 920.

In one configuration, the filter conditions 910 cached may include one or multiple threshold values, each of which may relate to the minimum or maximum of:
  received signal strength or SINR of the discovery message 920;
  discovery messages to be rebroadcast within a time interval;
  discovery periods used for rebroadcast;
  the amount of power needed for rebroadcast;
  noise rise observed during the reception of discovery message 920;
  messages discovered and decoded within a time period prior to the reception of discovery message 920;
  discovery messages initiated or rebroadcast within a certain time period;
  range with respect to a location contained in the discovery message 920; or
  a value (e.g. a hop count) contained in a control field in the received discovery message 920.

In one configuration, the filter conditions 910 cached may hold a reference code for a matching operation applied to the content of the received discovery messages (such as control plane flags in message, hop counts, group addresses, or service identifiers). In one configuration, the filter conditions 910 cached may hold a mask to a reference code or a field name designator. In one configuration, the filter conditions 910 cached may hold a requirement for authentication, decryption and authorization of certain messages discovered. In one configuration, the filter conditions 910 cached may hold keying material for an authentication procedure.

Based on the type of filter condition, the device 902 may or may not have to decode the discovery message 920 before applying the filter function at 924. For instance, it may be possible to exclude certain discovery messages from rebroadcast if these discovery messages are received with insufficient signal strength.

In one configuration, message processing at 926 may include changing a control field in the discovery message 920, such as setting a rebroadcast flag or incrementing a hop count. In one configuration, message processing at 926 may include adding or overwriting an integrity protection field in the discovery message 920. In one configuration, message processing at 926 may include encrypting the discovery message 920.

In one configuration, the message processing regulations 912 cached may include control field values to be entered into the discovery message 920. In one configuration, the message processing regulations 912 cached may include keying information for integrity protection or encryption. In one configuration, the message processing regulations 912 cached may include a group or destination address.

In one configuration, the transmission (at 928) of the processed discovery message 930 occurs on a D2D channel used for proximity services. The D2D channel for transmission of discovery message 930 may be the same or a different D2D channel as where the discovery message 920 is received. In one configuration, the discovery message 930 may be simultaneously scheduled for transmission on multiple D2D channels.

Figure 10:
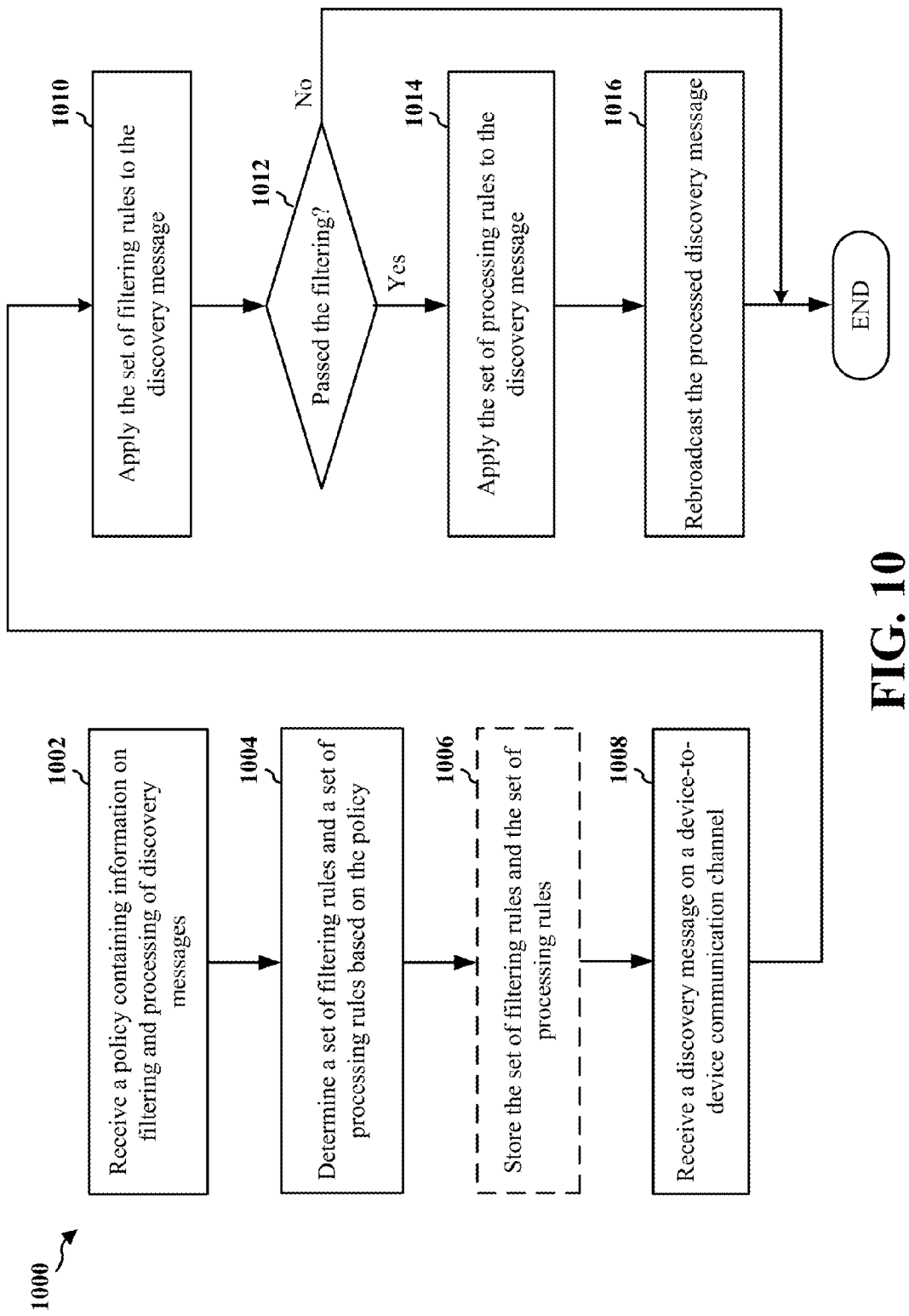
FIG. 10 is a flowchart of a method of wireless communication.

FIG. 10 is a flowchart 1000 of a method of wireless communication. Specifically, this figure illustrates a method of utilizing network-based control mechanism for relaying or rebroadcasting of discovery messages. The method may be performed by a UE (e.g. the UE 102, 206, the device 804, 902, or the apparatus 1402/1402'). At 1002, the UE receives a policy containing information on filtering and processing of discovery messages. In one configuration, the received policy may be the network-based policies 820 described above with reference to FIG. 8 or the policy information 904 described above with reference to FIG. 9. The policy may be received over a wireless interface. The wireless interface may be a downlink channel from a base station or an access point (e.g., 802). In one configuration, the policy may be received from a network or from a network server. The network server may be a ProSe server. In one configuration, operations performed at 1002 may correspond to operations described above with reference to 906 of FIG. 9.

At 1004, the UE determines a set of filtering rules and a set of processing rules based on the policy. In one configuration, the set of filtering rules may be the filter conditions 910 described above with reference to FIG. 9, and the set of processing rules may be the message processing regulations 912 described above with reference to FIG. 9. In one configuration, the UE may parse and/or decode the policy in order to determine the set of filtering rules and the set of processing rules. In one configuration, operations performed at 1004 may correspond to operations described above with reference to 908 of FIG. 9.

At 1006, the UE may optionally store the set of filtering rules and the set of processing rules. In one configuration, the UE may cache the set of filtering rules and the set of processing rules in an appropriate format, e.g. in tables.

At 1008, the UE receives a discovery message on a device-to-device communication channel. In one configuration, the discovery message may be the discovery message 822 described above with reference to FIG. 8 or the discovery message 920 described above with reference to FIG. 9. In one configuration, the device-to-device communication channel may be a wireless communication channel. In one configuration, operations performed at 1008 may correspond to operations described above with reference to 922 of FIG. 9.

At 1010, the UE applies the set of filtering rules to the discovery message. In one configuration, the set of filtering rules may include one or more filtering rules that evaluate the signal strength derived from the reception of the discovery message or the SINR derived from the reception of the discovery message. In one configuration, the set of filtering rules may evaluate one or more of the time interval for the discovery message to be rebroadcast, discovery periods used for rebroadcast, the amount of power needed for rebroadcast, the noise rise observed during message reception, a plurality of discovery messages discovered and decoded within a time period prior to the reception of the discovery message, a range with respect to a location contained in the discovery message, a value contained in a control field in the discovery message, a reference code for a matching operation applied to content of the discovery message, a mask to reference code, a field name designator, a requirement for authentication, decryption, and authorization of discovery messages, or keying material for an authentication procedure.

In one configuration, the set of filtering rules determines whether the discovery message is due for rebroadcast. In such configuration, the discovery message passes the set of filtering rules when the set of filtering rules determines that the discovery message is due for rebroadcast. For example, the set of filtering rules may include a minimum signal strength. The UE may compare the signal strength derived from the reception of the discovery message to the minimum signal strength, and determine that the discovery message passes the set of filtering rules when the signal strength derived from the reception of the discovery message is greater than or equal to the minimum signal strength. In one configuration, operations performed at 1010 may correspond to operations described above with reference to 924 of FIG. 9.

At 1012, the UE determines whether the discovery message passed the filtering performed at 1010. In one configuration, the discovery message passes the filtering when the UE determines that the discovery message satisfies conditions imposed by the set of filtering rules. If the discovery message passed the filtering, the method proceeds to 1014. If the discovery message did not pass the filtering, the method ends.

At 1014, the UE applies the set of processing rules to the discovery message. In one configuration, the set of processing rules may include one or more of: changing a control filed in the discovery message; adding or overwriting an integrity protection field in the discovery message; or encrypting the discovery message. In one configuration, operations performed at 1014 may correspond to operations described above with reference to 926 of FIG. 9.

At 1016, the UE rebroadcast the processed discovery message on a D2D communication channel. In one configuration, the processed discovery message may be the discovery message 824 described above with reference to FIG. 8 or the discovery message 930 described above with reference to FIG. 9. In one configuration, the D2D communication channel for rebroadcasting the process discovery message may be the same D2D communication channel for receiving the discovery message at 1008, or a different D2D communication channel. In one configuration, operations performed at 1016 may correspond to operations described above with reference to 928 of FIG. 9.

Figure 11:
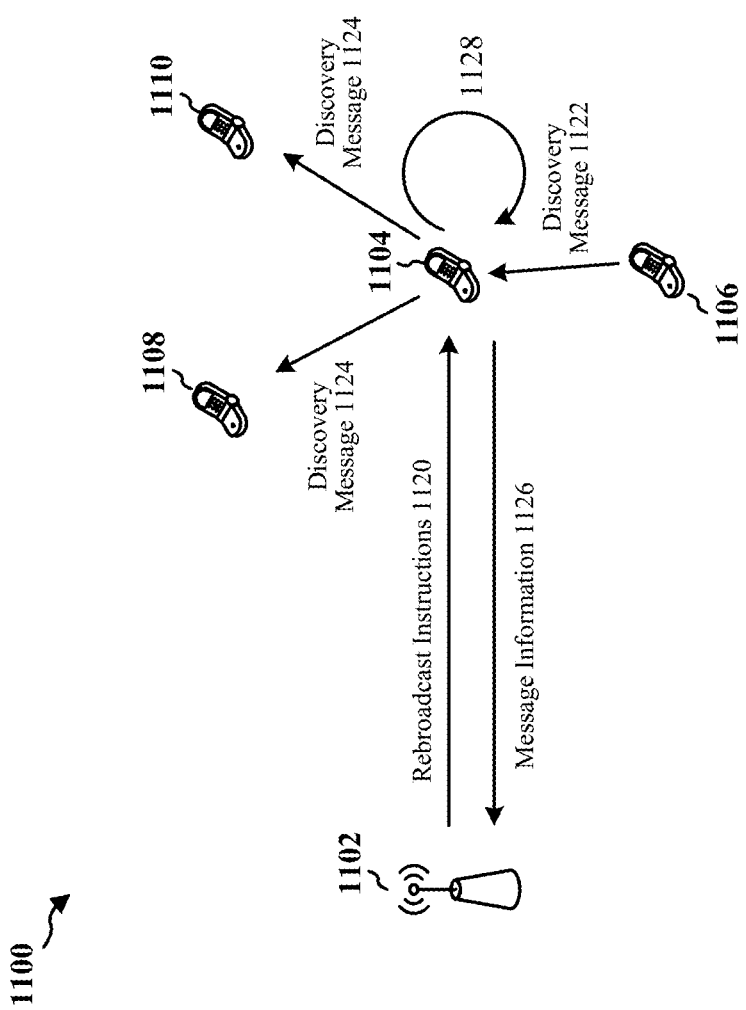
FIG. 11 is a diagram illustrating an example of network-based control mechanism for the relaying of device-to-device discovery messages in a device-to-device communications system.

FIG. 11 is a diagram illustrating an example of network-based control mechanism for the relaying of device-to-device discovery messages in a device-to-device communications system 1100. The D2D communications system 1100 includes several wireless devices 1104, 1106, 1108, 1110, and a base station or access point 1102. Some of the wireless devices 1104, 1106, 1108, 1110 may communicate together in device-to-device communication using the DL/UL WWAN spectrum, some of them may communicate with the base station 1102, and some may do both. For example, as shown in FIG. 11, the wireless devices 1104, 1106 are in device-to-device communication and the wireless device 1104 is in device-to-device communication with wireless devices 1108 and 1110. The wireless device 1104 is also communicating with the base station 1102.

In one configuration, the wireless device 1104 contacts the network through the base station 1102 upon reception of the discovery message 1122. The wireless device 1104 may extract message information 1126 from the received discovery message 1122, and transmits the message information 1126 to the base station 1102. The network may be a cellular network or a server that is connected to the wireless device 1104 through the base station or access point 1102. The network may generate rebroadcast instructions 1120 based on the message information 1126. The wireless device 1104 obtains, from the base station or access point 1102, rebroadcast instructions 1120 on the rebroadcast of the discovery message 1122. The wireless device 1104 processes (at 1128) the discovery message 1122 to generate discovery message 1124 based on the obtained rebroadcast instructions 1120. The wireless device 1104 rebroadcasts the discovery message 1124 to the wireless devices 1108 and 1110 based on the rebroadcast instructions 1120.

Figure 12:
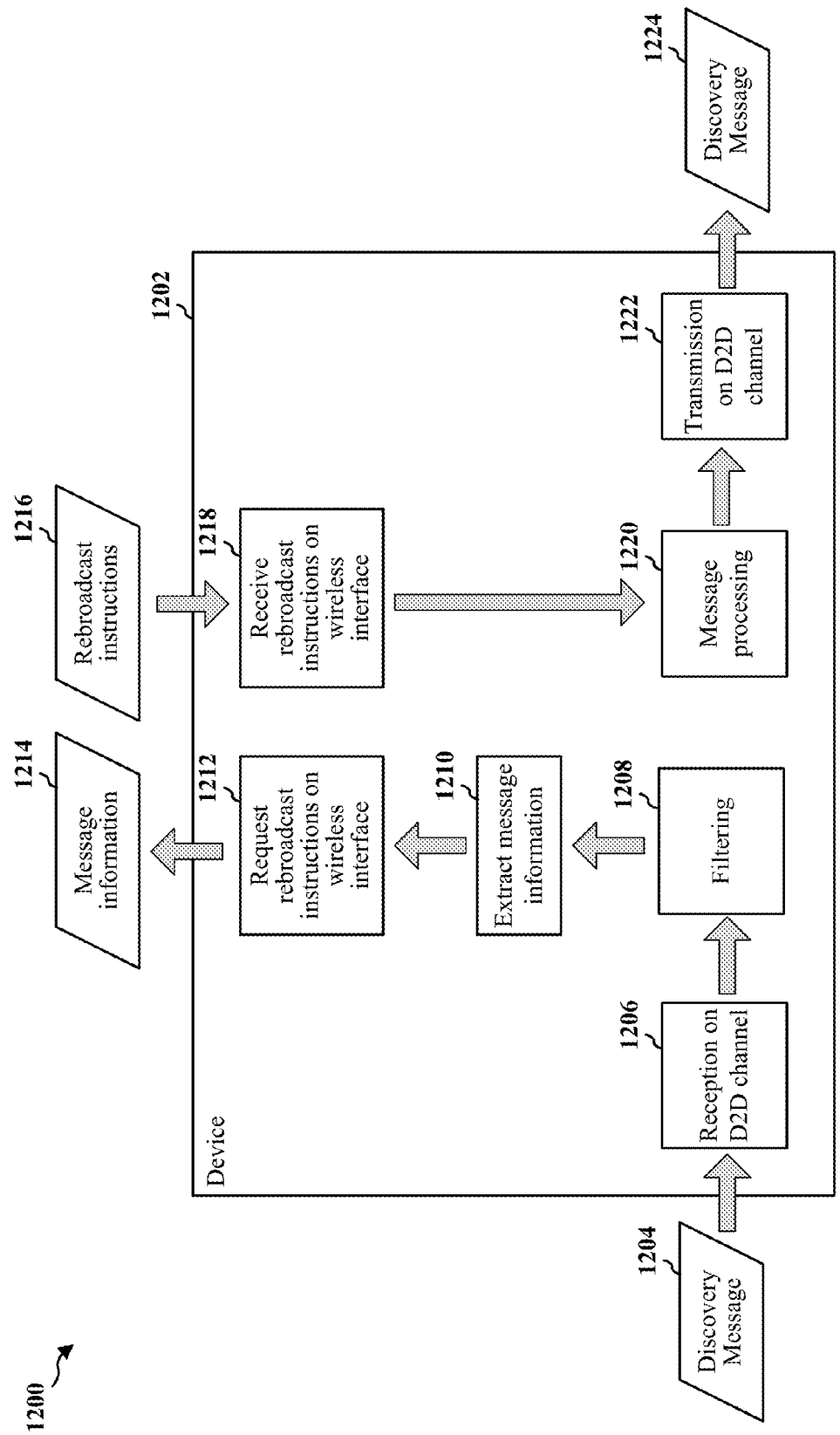
FIG. 12 is a diagram illustrating an example of network-based control mechanism for relaying or rebroadcasting of discovery messages.

FIG. 12 is a diagram 1200 illustrating an example of network-based control mechanism for relaying or rebroadcasting of discovery messages. In one configuration, this example of network-based control mechanism may be used in the D2D communications system 1100 described above with reference to FIG. 11. In this example, a wireless device 1202 receives a discovery message 1204. The wireless device 1202 contacts the network upon reception of the discovery message 1204 and obtains rebroadcast instructions 1216 on the rebroadcast of the discovery message 1204. In one configuration, each of the wireless device 1202 and its peers may be a UE (e.g. the UE 102, 206, the wireless device 1104, or the apparatus 1402/1402'). In one configuration, the device 1202 may be the wireless device 1104 described above with reference to FIG. 11.

In one configuration, the device 1202 receives and decodes (at 1206) the discovery message 1204 on a D2D channel. The device 1202 may apply (at 1208) a filter function which decides if instructions on rebroadcast of the discovery message 1204 have to be obtained from the network. In one configuration, this filter function may be based on the network-based policies 820 described above with reference to FIG. 8 or the policy information 904 described above with reference to FIG. 9. In one configuration, the filter rules may be configured or hardcoded on the device 1202. In one configuration, the filter conditions may be the filter conditions 910 described above with reference to FIG. 9.

In case the outcome of the filter function is that network-based rebroadcast instructions are required, the device 1202 extracts (at 1210) message information 1214 needed for the network from the discovery message 1204. In one configuration, the message information 1214 may include a part of the discovery message 1204, e.g. certain control plane fields such as the message origin, destination, hop count, or rebroadcast request flag. In one configuration, the message information 1214 may include the entire messages body of the discovery message 1204. In one configuration, the device 1202 may cache the entire or a part of the discovery message 1204.

The device 1202 sends (at 1212) the extracted message information 1214 on a wireless interface to the network to request rebroadcast instructions. The wireless interface may refer to the uplink of a base station or an access point (e.g., 1102). In one configuration, the base station may pertain to a cellular network which directly provides instructions on the relaying of discovery messages. In one configuration, the device 1202 may connect to a server, and forward the extracted message information 1214 to the server using a wireless link to a base station or an access point (e.g., 1102). The server may for instance refer to a Proximity Services Function in LTE.

The device 1202 receives (at 1218), on the downlink of a wireless air interface, rebroadcast instructions 1216 on the rebroadcast of the discovery message 1204. This wireless air interface may be the same as the one used for requesting rebroadcast instructions or a different one. In one configuration, the rebroadcast instructions 1216 may be received on the same link, during the same connection or in the same session, for requesting the rebroadcast instructions. In another configuration, the network and the device 1202 may initiate a different link, connection or session for requesting the rebroadcast instructions and for replying with the rebroadcast instructions.

The rebroadcast instructions 1216 by the network may include information on the alteration of the body of the discovery message 1204, or on certain fields to be changed on the cached discovery message 1204. Such changes may include one or more of a hop count, a rebroadcast flag, or an authentication field. The rebroadcast instructions 1216 may provide the changes directly, or may provide information for the device 1202 to compute these changes. In one configuration, the rebroadcast instructions 1216 may include the entire discovery message to be rebroadcast by the device 1202.

The device 1202 applies (at 1220) the changes based on the rebroadcast instructions 1216. In one configuration, the device 1202 may apply (at 1220) further processing steps, such as the message processing regulations 912 and operations performed at 926 described above with reference to FIG. 9. After message processing at 1220, the device 1202 transmits (at 1222) the processed discovery message 1224 on a wireless D2D channel.

In one configuration, a D2D channel may refer to a wireless protocol that permits exchange of discovery messages between wireless devices. Such a D2D channel may be provided by technologies such as LTE-D, near-me area network (NAN), Social WiFi, iBeacon, 802.11 ad-hoc mode, for instance. In one configuration, the D2D channel may share wireless resources such as spectrum with other wireless services. For example, a D2D channel based on LTE-Direct or WiFi-Direct may share wireless resources with other wireless services. In one configuration, D2D discovery may use dedicated wireless resources.

In one configuration, the transmission (at 1222) of the processed discovery message 1224 occurs on a D2D channel used for proximity services. The D2D channel for transmission of discovery message 1224 may be the same or a different D2D channel as where the discovery message 1204 is received. In one configuration, the discovery message 1224 may be simultaneously scheduled for transmission on multiple D2D channels.

Figure 13:
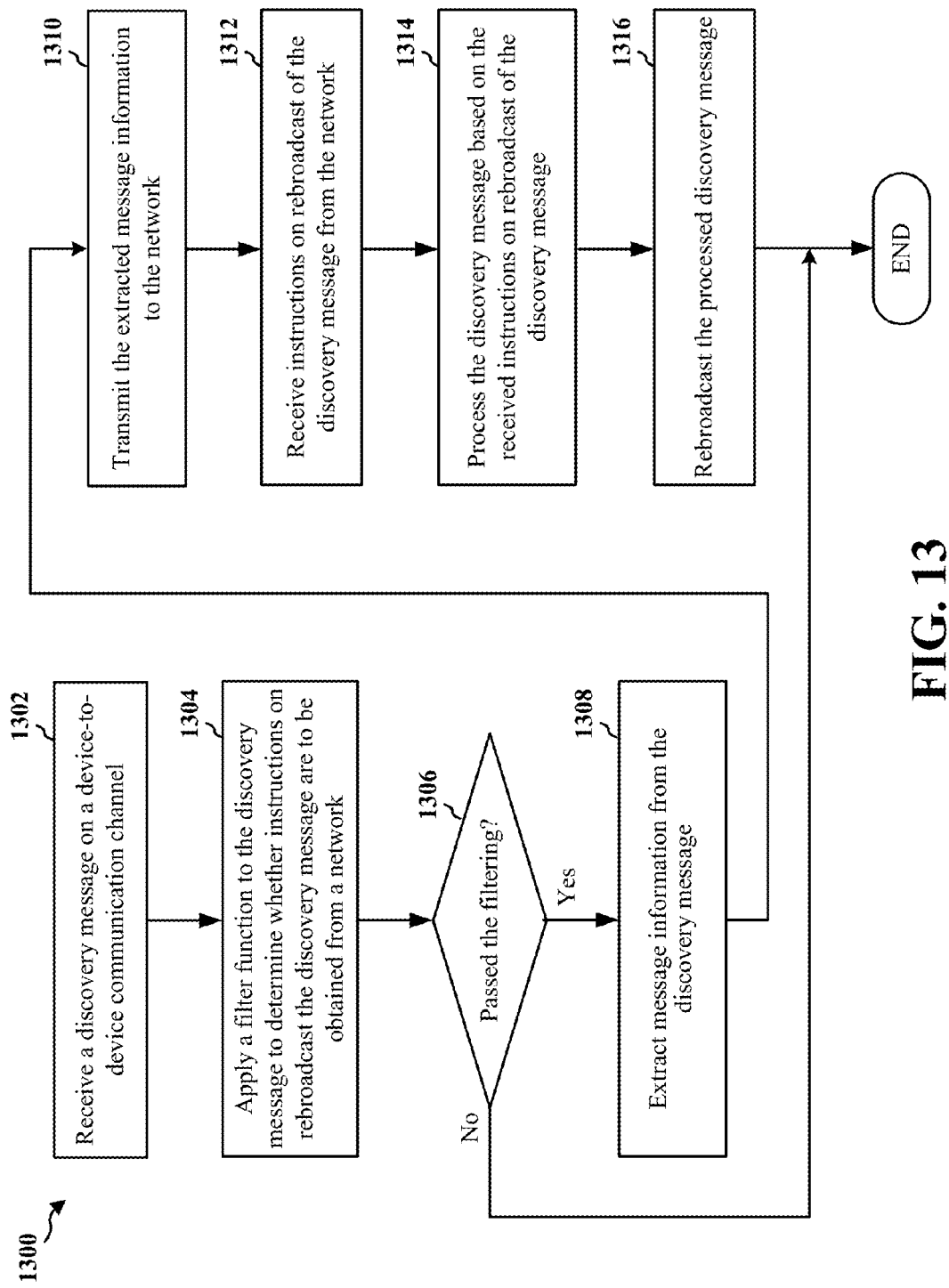
FIG. 13 is a flowchart of a method of wireless communication.

FIG. 13 is a flowchart 1300 of a method of wireless communication. Specifically, this figure illustrates a method of utilizing network-based control mechanism for relaying or rebroadcasting of discovery messages. The method may be performed by a UE (e.g. the UE 102, 206, the device 1104, 1202, or the apparatus 1402/1402'). At 1302, the UE receives a discovery message on a device-to-device communication channel. In one configuration, the discovery message may be the discovery message 1122 described above with reference to FIG. 11 or the discovery message 1204 described above with reference to FIG. 12. In one configuration, the device-to-device communication channel may be a wireless communication channel. In one configuration, operations performed at 1302 may correspond to operations described above with reference to 1206 of FIG. 12.

At 1304, the UE applies a filter function to the discovery message to determine whether instructions on rebroadcast the discovery message are to be obtained from a network. For example, the filter function may include a minimum signal strength. The UE may compare the signal strength derived from the reception of the discovery message to the minimum signal strength, and determine that the discovery message passes the filter function when the signal strength derived from the reception of the discovery message is greater than or equal to the minimum signal strength. In one configuration, operations performed at 1304 may correspond to operations described above with reference to 1208 of FIG. 12.

At 1306, the UE determines whether the discovery message passed the filtering performed at 1304. In one configuration, the discovery message passes the filtering when the UE determines that the discovery message satisfies conditions imposed by the filter function. If the discovery message passed the filtering, the method proceeds to 1308. If the discovery message did not pass the filtering, the method ends.

At 1308, the UE extracts message information from the discovery message. In one configuration, the extracted message information includes at least a part of the discovery message. In one configuration, the extracted message information may be the message information 1126 described above with reference to FIG. 11 or the message information 1214 described above with reference to FIG. 12. In one configuration, operations performed at 1308 may correspond to operations described above with reference to 1210 of FIG. 12.

At 1310, the UE transmits the extracted message information to the network to request rebroadcast instructions. In one configuration, the extracted message information may be transmitted to a cellular network or to a network server. In one configuration, operations performed at 1310 may correspond to operations described above with reference to 1212 of FIG. 12.

At 1312, the UE receives rebroadcast instructions on rebroadcast of the discovery message from the network. In one configuration, the rebroadcast instructions may be the rebroadcast instructions 1120 described above with reference to FIG. 11 or the rebroadcast instructions 1216 described above with reference to FIG. 12. In one configuration, the rebroadcast instructions may include information on alteration of the discovery message or on certain fields to be changed on the discovery message. In one configuration, the extracted message information may be transmitted over a first wireless interface and the rebroadcast instructions may be received over a second wireless interface. The second wireless interface may be the same wireless interface as the first wireless interface or a different wireless interface. In one configuration, operations performed at 1312 may correspond to operations described above with reference to 1218 of FIG. 12.

At 1314, the UE processes the discovery message based on the received instructions on rebroadcast of the discovery message. In one configuration, operations performed at 1314 may correspond to operations described above with reference to 1220 of FIG. 12.

At 1316, the UE rebroadcast the processed discovery message on a D2D communication channel. In one configuration, the processed discovery message may be the discovery message 1124 described above with reference to FIG. 11 or the discovery message 1224 described above with reference to FIG. 12. In one configuration, the D2D communication channel for rebroadcasting the process discovery message may be the same D2D communication channel for receiving the discovery message at 1302, or a different D2D communication channel. In one configuration, operations performed at 1316 may correspond to operations described above with reference to 1222 of FIG. 12.

Figure 14:
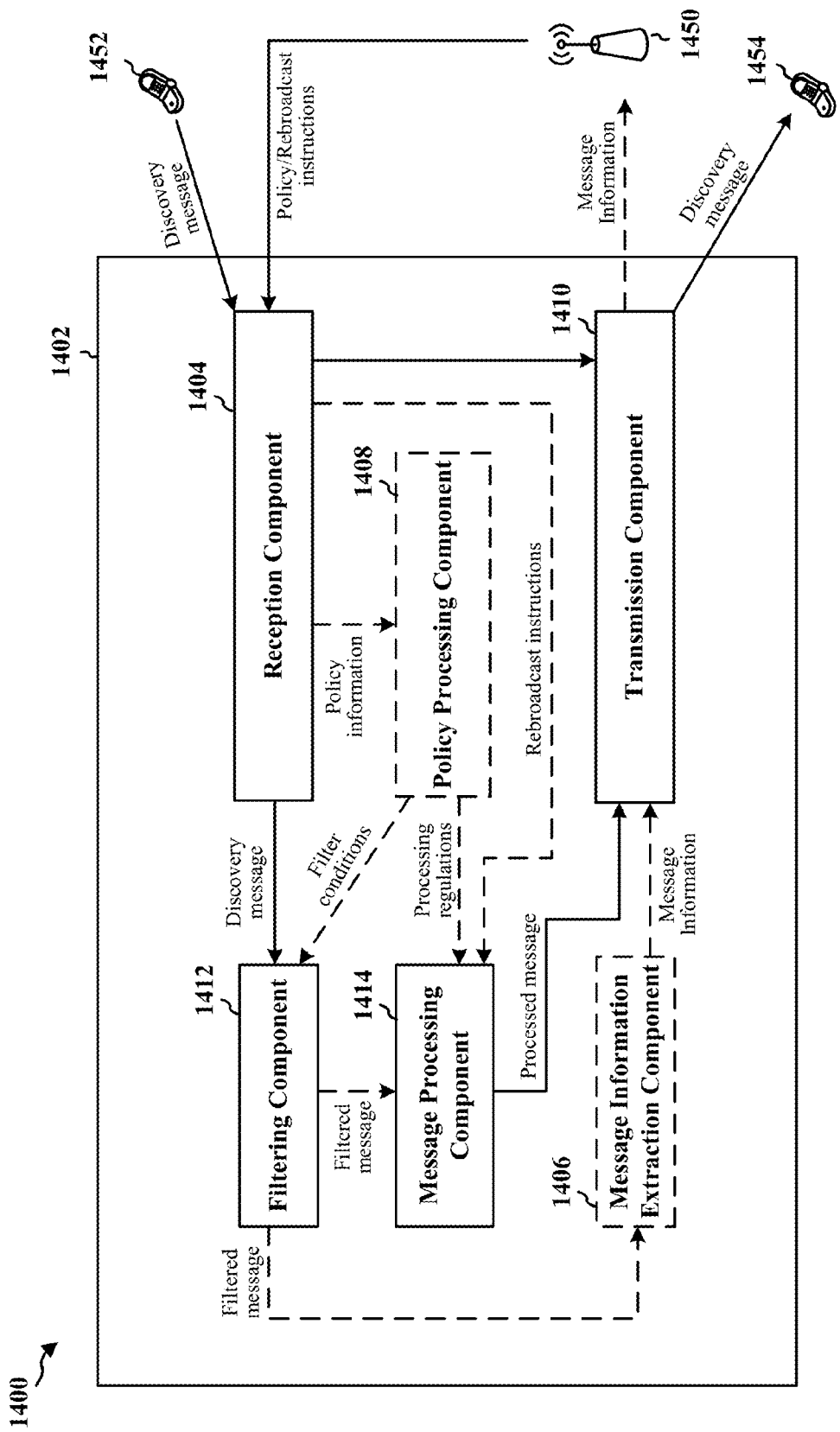
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus 1402 may be a UE (e.g., 804, 902, 1104, or 1202). The apparatus 1402 includes a reception component 1404 that may receive message rebroadcast policy or rebroadcast instructions from a base station or an access point 1450. The reception component 1404 may also receive discovery message from a peer UE 1452. In one configuration, the reception component 1404 may perform operations described above with reference to 906/922 of FIG. 9, 1002/1008 of FIG. 10, 1206/1218 of FIG. 12, or 1302/1312 of FIG. 13.

The apparatus 1402 includes a transmission component 1410 that transmits/rebroadcast discovery message to a peer UE 1454. In one configuration, the transmission component 1410 may transmit message information to the base station or access point 1450. In one configuration, the transmission component 1410 may perform operations described above with reference to 928 of FIG. 9, 1016 of FIG. 10, 1212/1222 of FIG. 12, or 1310/1316 of FIG. 13. In one configuration, the reception component 1404 and the transmission component 1410 coordinate with each other to perform communications for the apparatus 1402.

The apparatus 1402 may optionally include a policy processing component 1408 that receives rebroadcast policy information from the reception component 1404. The policy processing component 1408 may determine a set of filtering conditions and a set of processing regulations based on the rebroadcast policy information. In one configuration, the policy processing component 1408 may perform operations described above with reference to 908 of FIG. 9 or 1004 of FIG. 10.

The apparatus 1402 may include a filtering component 1412 that receives the discovery message from the reception component 1404. The filtering component 1412 may receive the set of filter conditions from the policy processing component 1408. In one configuration, the filtering component 1412 may apply the set of filter conditions to the discovery message. In another configuration, the filtering component 1412 may apply a filter function to the discovery message to determine whether instructions on rebroadcast the discovery message are to be obtained from the network. In one configuration, the filtering component 1412 may perform operations described above with reference to 924 of FIG. 9, 1010 of FIG. 10, 1208 of FIG. 12, or 1304 of FIG. 13.

The apparatus 1402 may include a message processing component 1414 that may receive the filtered discovery message from the filtering component 1412. In one configuration, instead of receiving the filtered discovery message, the message processing component 1414 may receive rebroadcast instructions from the reception component 1404. The message processing component 1414 may receive the set of processing regulations from the policy processing component 1408. In one configuration, the message processing component 1414 may apply the set of processing regulations to the filtered discovery message. In another configuration, the message processing component 1414 may process the discovery message based on the received rebroadcast instructions. The message processing component 1414 may provide the processed discovery message to the transmission component 1410. In one configuration, the message processing component 1414 may perform operations described above with reference to 926 of FIG. 9, 1014 of FIG. 10, 1220 of FIG. 12, or 1314 of FIG. 13.

The apparatus 1402 may optionally include a message information extraction component 1406 that may receive filtered discovery message from the filtering component 1412. The message information extraction component 1406 may extract message information from the discovery message and provide the message information to the transmission component 1410. In one configuration, the message information extraction component 1406 may perform operations described above with reference to 1210 of FIG. 10 or 1308 of FIG. 13.

The apparatus 1402 may include additional components that perform each of the blocks of the algorithm in the aforementioned flowcharts of FIGS. 10 and 13. As such, each block in the aforementioned flowcharts of FIGS. 10 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
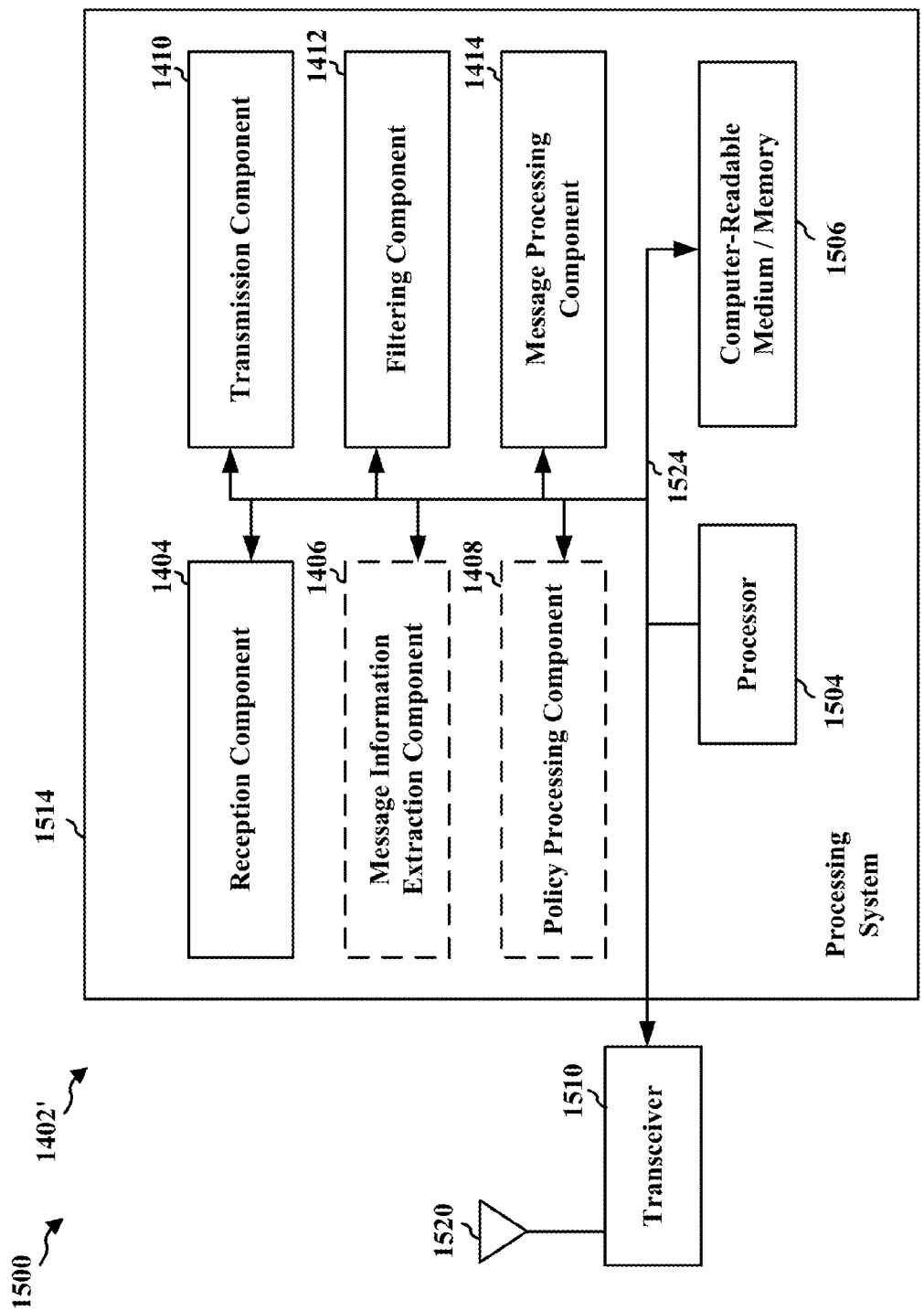
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, and 1414. The components may be software components running in the processor 1504, resident/stored in the computer readable medium/memory 1506, one or more hardware components coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' may include means for receiving a policy containing information on filtering and processing of discovery messages. In one configuration, the means for receiving a policy may be the transceiver 1510, the one or more antennas 1520, the reception component 1404, or the processor 1504. In one configuration, the means for receiving a policy may perform operations described above with reference to 906 of FIG. 9 or 1002 of FIG. 10.

In one configuration, the apparatus 1402/1402' may include means for determining a set of filtering rules and a set of processing rules based on the policy. In one configuration, the means for determining a set of filtering rules and a set of processing rules may be the policy processing component 1408 or the processor 1504. In one configuration, the means for determining a set of filtering rules and a set of processing rules may perform operations described above with reference to 908 of FIG. 9 or 1004 of FIG. 10.

In one configuration, the apparatus 1402/1402' may include means for receiving a discovery message on a device-to-device communication channel. In one configuration, the means for receiving a discovery message may be the transceiver 1510, the one or more antennas 1520, the reception component 1404, or the processor 1504. In one configuration, the means for receiving a discovery message may perform operations described above with reference to 922 of FIG. 9, 1008 of FIG. 10, 1206 of FIG. 12, or 1302 of FIG. 13.

In one configuration, the apparatus 1402/1402' may include means for applying the set of filtering rules to the discovery message. In one configuration, the means for applying the set of filtering rules may be the filtering component 1412 or the processor 1504. In one configuration, the means for applying the set of filtering rules may perform operations described above with reference to 924 of FIG. 9 or 1010 of FIG. 10.

In one configuration, the apparatus 1402/1402' may include means for applying the set of processing rules to the discovery message. In one configuration, the means for applying the set of processing rules may be configured to perform one or more of: changing a control filed in the discovery message; adding or overwriting an integrity protection field in the discovery message; or encrypting the discovery message. In one configuration, the means for applying the set of processing rules may be the message processing component 1414 or the processor 1504. In one configuration, the means for applying the set of processing rules may perform operations described above with reference to 926 of FIG. 9 or 1014 of FIG. 10.

In one configuration, the apparatus 1402/1402' may include means for rebroadcasting the discovery message. In one configuration, the means for rebroadcasting the discovery message may be the transceiver 1510, the one or more antennas 1520, the transmission component 1410, or the processor 1504. In one configuration, the means for rebroadcasting the discovery message may perform operations described above with reference to 928 of FIG. 9, 1016 of FIG. 10, 1222 of FIG. 12, or 1316 of FIG. 13.

In one configuration, the apparatus 1402/1402' may include means for storing the set of filtering rules and the set of processing rules. In one configuration, the means for storing the set of filtering rules and the set of processing rules may be the policy processing component 1408 or the processor 1504. In one configuration, the means for storing the set of filtering rules and the set of processing rules may perform operations described above with reference to 908 of FIG. 9 or 1006 of FIG. 10.

In one configuration, the apparatus 1402/1402' may include means for extracting message information from the discovery message. In one configuration, the means for extracting message information from the discovery message may be the message information extraction component 1406 or the processor 1504. In one configuration, the means for extracting message information from the discovery message may perform operations described above with reference to 1210 of FIG. 12 or 1308 of FIG. 13.

In one configuration, the apparatus 1402/1402' may include means for transmitting the extracted message information. In one configuration, the means for transmitting the extracted message information may be the transceiver 1510, the one or more antennas 1520, the transmission component 1410, or the processor 1504. In one configuration, the means for transmitting the extracted message information may perform operations described above with reference to 1212 of FIG. 12 or 1310 of FIG. 13.

In one configuration, the apparatus 1402/1402' may include means for receiving instructions on rebroadcast of the discovery message. In one configuration, the means for receiving instructions on rebroadcast of the discovery message may be the transceiver 1510, the one or more antennas 1520, the reception component 1404, or the processor 1504. In one configuration, the means for receiving instructions on rebroadcast of the discovery message may perform operations described above with reference to 1218 of FIG. 12 or 1312 of FIG. 13.

In one configuration, the apparatus 1402/1402' may include means for applying a filter function to the discovery message to determine whether instructions on rebroadcast the discovery message are to be obtained from a network. In one configuration, the means for applying a filter function to the discovery message may be the filtering component 1412 or the processor 1504. In one configuration, the means for applying a filter function to the discovery message may perform operations described above with reference to 1208 of FIG. 12 or 1304 of FIG. 13.

In one configuration, the apparatus 1402/1402' may include means for processing the discovery message based on the instructions on rebroadcast of the discovery message. In one configuration, the means for processing the discovery message based on the instructions may be the message processing component 1414 or the processor 1504. In one configuration, the means for processing the discovery message based on the instructions may perform operations described above with reference to 1220 of FIG. 12 or 1314 of FIG. 13.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    determining a set of filtering rules and a set of processing rules based on a policy containing information on filtering and processing of discovery messages, wherein the set of filtering rules are used for determining whether the discovery messages are due for rebroadcast;
    applying the set of filtering rules to a received discovery message;
    applying the set of processing rules to the discovery message in response to the discovery message passing the set of filtering rules; and
    rebroadcasting the discovery message.

2. The method of claim 1, further comprising receiving the policy, wherein the policy is received over a wireless interface, wherein the wireless interface is a downlink channel from a base station or an access point.

3. The method of claim 1, further comprising receiving the discovery message on a device-to-device communication channel, wherein the device-to-device communication channel is a wireless communication channel.

4. The method of claim 1, wherein the policy is received from a network or from a network server.

5. The method of claim 4, wherein the network server is a Proximity Services (ProSe) server.

6. The method of claim 1, wherein the set of filtering rules comprises one or more filtering rules that evaluate a signal strength derived from the receiving of the discovery message or a signal-to-interference-plus-noise ratio (SINR) derived from the receiving of the discovery message.

7. The method of claim 1, wherein the set of filtering rules evaluates one or more of a time interval for the discovery message to be rebroadcast, discovery periods used for rebroadcast, an amount of power needed for rebroadcast, a noise rise observed during message reception, a plurality of discovery messages discovered and decoded within a time period prior to the receiving of the discovery message, a range with respect to a location contained in the discovery message, a value contained in a control field in the discovery message, a reference code for a matching operation applied to content of the discovery message, a mask to reference code, a field name designator, a requirement for authentication, decryption, and authorization of discovery messages, or keying material for an authentication procedure.

8. The method of claim 1, wherein the discovery message passes the set of filtering rules when the set of filtering rules determines that the discovery message is due for rebroadcast.

9. The method of claim 1, wherein the applying the set of processing rules comprises one or more of:
changing a control filed in the discovery message;
adding or overwriting an integrity protection field in the discovery message; or
encrypting the discovery message.

10. The method of claim 1, wherein the discovery message is rebroadcast on the same device-to-device communication channel for the receiving of the discovery message or a different device-to-device communication channel.

11. A method of wireless communication, comprising:
extracting message information from a received discovery message;
transmitting the extracted message information;
receiving instructions on rebroadcast of the discovery message; and
rebroadcasting the discovery message based on the received instructions.

12. The method of claim 11, further comprising:
receiving the discovery message on a device-to-device communication channel; and
applying a filter function to the discovery message to determine whether instructions on rebroadcast the discovery message are to be obtained from a network, wherein the extracting and the transmitting are in response to an outcome of the applying the filter function that the instructions on rebroadcast the discovery message are to be obtained from the network.

13. The method of claim 11, wherein the extracted message information is transmitted over a first wireless interface and the instructions are received over a second wireless interface, wherein the second wireless interface is the same wireless interface as the first wireless interface or a different wireless interface.

14. The method of claim 11, wherein the extracted message information comprises at least a part of the discovery message.

15. The method of claim 11, wherein the extracted message information is transmitted to a network or to a network server.

16. The method of claim 11, wherein the instructions comprise information on alteration of the discovery message or on certain fields to be changed on the discovery message.

17. The method of claim 11, further comprising processing the discovery message based on the instructions on rebroadcast of the discovery message, wherein the rebroadcasting the discovery message comprises rebroadcasting the processed discovery message.

18. An apparatus for wireless communication, comprising:
a memory; and
at least one processor coupled to the memory and configured to:
determine a set of filtering rules and a set of processing rules based on a policy containing information on filtering and processing of discovery messages, wherein the set of filtering rules are used for determining whether the discovery messages are due for rebroadcast;
apply the set of filtering rules to the discovery message;
apply the set of processing rules to the discovery message in response to the discovery message passing the set of filtering rules; and
rebroadcast the discovery message.

19. The apparatus of claim 18, wherein the at least one processor is further configured to receive the policy, wherein the policy is received over a wireless interface, wherein the wireless interface is a downlink channel from a base station or an access point.

20. The apparatus of claim 18, wherein the policy is received from a network or from a network server.

21. The apparatus of claim 18, wherein the set of filtering rules comprises one or more filtering rules that evaluate a signal strength derived from the receiving of the discovery message or a signal-to-interference-plus-noise ratio (SINR) derived from the receiving of the discovery message.

22. The apparatus of claim 18, wherein the set of filtering rules evaluates one or more of a time interval for the discovery message to be rebroadcast, discovery periods used for rebroadcast, an amount of power needed for rebroadcast, a noise rise observed during message reception, a plurality of discovery messages discovered and decoded within a time period prior to the receiving of the discovery message, a range with respect to a location contained in the discovery message, a value contained in a control field in the discovery message, a reference code for a matching operation applied to content of the discovery message, a mask to reference code, a field name designator, a requirement for authentication, decryption, and authorization of discovery messages, or keying material for an authentication procedure.

23. The apparatus of claim 18, wherein the discovery message passes the set of filtering rules when the set of filtering rules determines that the discovery message is due for rebroadcast.

24. The apparatus of claim 18, wherein, to apply the set of processing rules, the at least one processor is configured to perform one or more of:

changing a control filed in the discovery message;
adding or overwriting an integrity protection field in the discovery message; or
encrypting the discovery message.

25. An apparatus for wireless communication, comprising:
a memory; and
at least one processor coupled to the memory and configured to:
extract message information from a received discovery message;
transmit the extracted message information;
receive instructions on rebroadcast of the discovery message; and
rebroadcast the discovery message based on the received instructions.

26. The apparatus of claim 25, wherein the at least one processor is further configured to:
receive the discovery message on a device-to-device communication channel; and
apply a filter function to the discovery message to determine whether instructions on rebroadcast the discovery message are to be obtained from a network, wherein the extracting and the transmitting are in response to an outcome of the applying the filter function that the instructions on rebroadcast the discovery message are to be obtained from the network.

27. The apparatus of claim 25, wherein the extracted message information comprises at least a part of the discovery message.

28. The apparatus of claim 25, wherein the extracted message information is transmitted to a network or to a network server.

29. The apparatus of claim 25, wherein the instructions comprise information on alteration of the discovery message or on certain fields to be changed on the discovery message.

30. The apparatus of claim 25, wherein the at least one processor is further configured to process the discovery message based on the instructions on rebroadcast of the discovery message, wherein, to rebroadcast the discovery message, the at least one processor is configured to rebroadcast the processed discovery message.

* * * * *